US012631722B2

(12) United States Patent
Svendsen et al.

(10) Patent No.: US 12,631,722 B2
(45) Date of Patent: May 19, 2026

(54) PROXIMITY DETECTION FOR A BEAMFORMING TRANSCEIVER

(71) Applicant: NOKIA TECHNOLOGIES OY, Espoo (FI)

(72) Inventors: Simon Svendsen, Aalborg (DK); Samantha Caporal Del Barrio, Aalborg (DK); Christian Rom, Aalborg (DK); Benny Vejlgaard, Gistrup (DK); Johannes Harrebek, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 303 days.

(21) Appl. No.: 18/251,902

(22) PCT Filed: Oct. 22, 2021

(86) PCT No.: PCT/FI2021/050709
§ 371 (c)(1),
(2) Date: May 5, 2023

(87) PCT Pub. No.: WO2022/096779
PCT Pub. Date: May 12, 2022

(65) Prior Publication Data
US 2023/0417869 A1 Dec. 28, 2023

(30) Foreign Application Priority Data
Nov. 6, 2020 (FI) ...................................... 20206126

(51) Int. Cl.
*G01S 7/03* (2006.01)
*G01S 7/02* (2006.01)
(Continued)

(52) U.S. Cl.
CPC ................ *G01S 7/03* (2013.01); *G01S 7/025* (2013.01); *G01S 7/026* (2013.01); *G01S 2013/0254* (2013.01); *G01S 13/931* (2013.01)

(58) Field of Classification Search
CPC . G01S 7/03; G01S 7/025; G01S 7/026; G01S 13/931; G01S 2013/0254;
(Continued)

(56) References Cited

U.S. PATENT DOCUMENTS

2008/0218424 A1* 9/2008 Blanton ............... H01Q 21/061
342/359
2010/0149068 A1 6/2010 Petersson et al.
(Continued)

FOREIGN PATENT DOCUMENTS

WO WO 2017/207041 A1 12/2017
WO WO 2018/097817 A1 5/2018
(Continued)

OTHER PUBLICATIONS

Apple, "Considerations on multi-panel and MPE in FR2", 3GPP TSG RAN WG1 #96bis, R1-1904983, (Apr. 8-12, 2019), 7 pages.
(Continued)

*Primary Examiner* — David E Lotter
(74) *Attorney, Agent, or Firm* — ALSTON & BIRD LLP

(57) ABSTRACT

According to an aspect, there is provided an apparatus for a radio frequency front end of a beamforming transmitter or transceiver. The apparatus comprises a dual-polarized antenna element (222) for reception of electromagnetic waves transmitted by an antenna array (221) of the radio frequency front end and subsequently reflected from at least one obstruction. The dual-polarized antenna element comprises first and second feed points (223, 224) for reception of a first polarization and of a second polarization. The apparatus further comprises a switch for switching between
(Continued)

reception of the first polarization via the first feed point and the second polarization via the second feed point.

18 Claims, 6 Drawing Sheets

(51) Int. Cl.
    *G01S 13/02*         (2006.01)
    *G01S 13/931*       (2020.01)

(58) Field of Classification Search
    CPC ........ H04B 1/3838; H04B 17/30; H04B 1/40;
                                         H04W 52/283
    See application file for complete search history.

(56) References Cited

U.S. PATENT DOCUMENTS

| | | | |
|---|---|---|---|
| 2014/0128032 A1 | 5/2014 | Muthukumar | |
| 2017/0290011 A1 | 10/2017 | Kushnir et al. | |
| 2018/0212313 A1 | 7/2018 | Harper | |
| 2018/0248249 A1 | 8/2018 | Mercer et al. | |
| 2018/0287651 A1 | 10/2018 | Fernando et al. | |
| 2018/0348353 A1 | 12/2018 | Lien et al. | |
| 2019/0044561 A1* | 2/2019 | Fernando | G01S 13/878 |
| 2019/0187247 A1 | 6/2019 | Izadian et al. | |
| 2019/0261289 A1 | 8/2019 | Raghavan et al. | |
| 2019/0267709 A1 | 8/2019 | Mow et al. | |
| 2019/0353750 A1 | 11/2019 | Rimini et al. | |
| 2019/0377075 A1* | 12/2019 | Tsfati | H04B 17/27 |
| 2020/0166623 A1 | 5/2020 | Sahin et al. | |
| 2020/0300996 A1 | 9/2020 | Cetinoneri et al. | |

FOREIGN PATENT DOCUMENTS

| | | |
|---|---|---|
| WO | WO 2018/182723 A1 | 10/2018 |
| WO | WO 2018/210427 A1 | 11/2018 |

OTHER PUBLICATIONS

CRFS, "How accurate is TDOA geolocation?", Retrieved on May 6, 2024; Retrieved via the Wayback Machine: <URL:https://web.archive.org/web/20211020084112/https://www.crfs.com/blog/how-accurate-tdoa-geolocation/>, (Oct. 20, 2021), 12 pages.

International Search Report and Written Opinion for Patent Cooperation Treaty Application No. PCT/FI2021/050709 dated Feb. 8, 2022, 20 pages.

Office Action for Finland U.S. Appl. No. 20/206,126 dated Mar. 3, 2022, 1 page.

Office Action for Finland U.S. Appl. No. 20/206,126 dated May 25, 2021, 14 pages.

Orović et al., "Compressive Sensing in Signal Processing: Algorithms and Transform Domain Formulations", Mathematical Problems in Engineering, vol. 2016, Article 7616393, (Oct. 25, 2016), 17 pages.

Partial European Search Report for European Application No. 21888737.0 dated Mar. 11, 2024, 14 pages.

Extended European Search Report for European Application No. 21888737.0 dated Jul. 16, 2024, 16 pages.

Intention to Grant for European Application No. 21888737.0 dated May 12, 2025, 58 pages.

\* cited by examiner

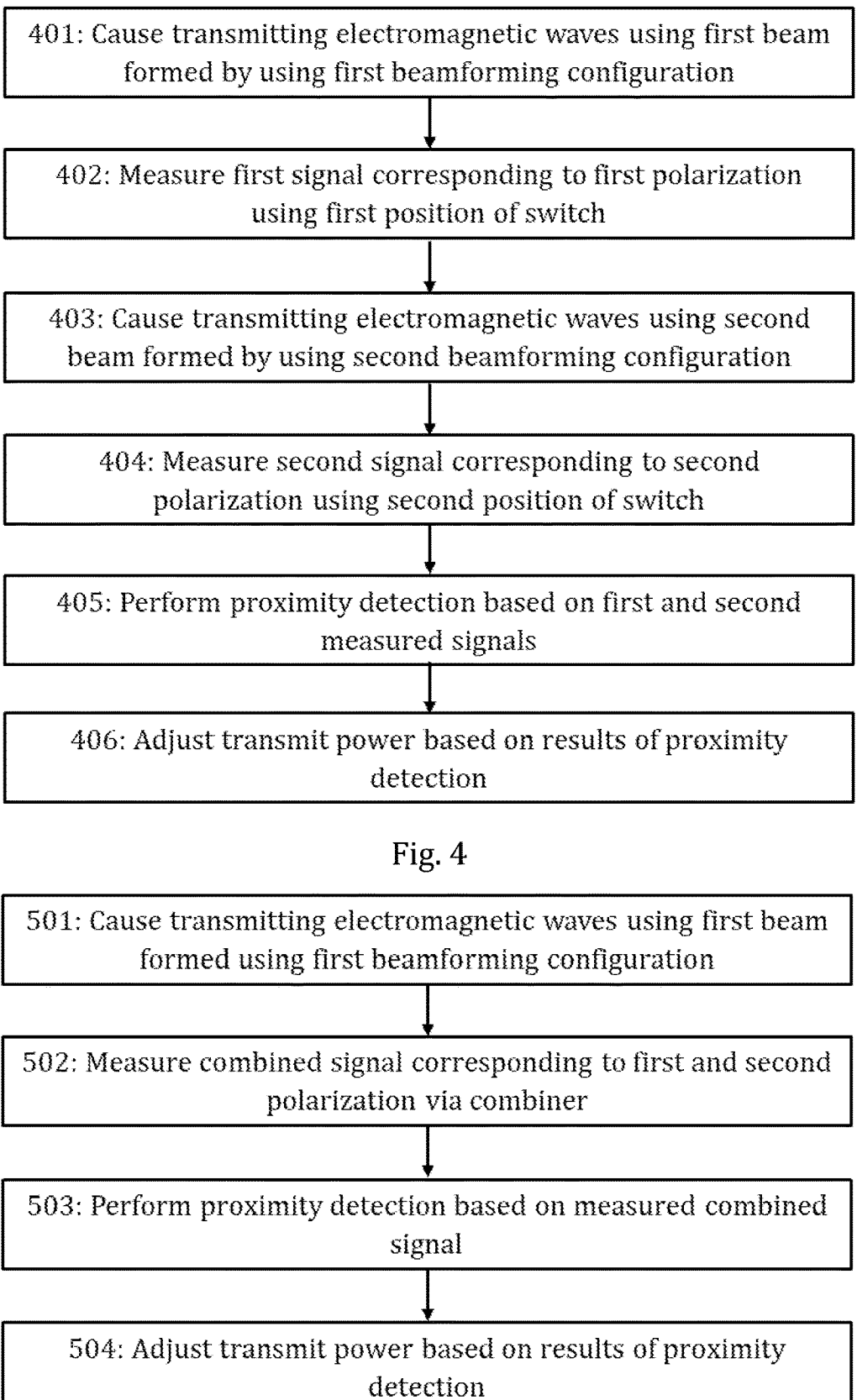

401: Cause transmitting electromagnetic waves using first beam formed by using first beamforming configuration 402: Measure first signal corresponding to first polarization using first position of switch 403: Cause transmitting electromagnetic waves using second beam formed by using second beamforming configuration 404: Measure second signal corresponding to second polarization using second position of switch 405: Perform proximity detection based on first and second measured signals 406: Adjust transmit power based on results of proximity detection

Fig. 4

501: Cause transmitting electromagnetic waves using first beam formed using first beamforming configuration 502: Measure combined signal corresponding to first and second polarization via combiner 503: Perform proximity detection based on measured combined signal 504: Adjust transmit power based on results of proximity detection

PROXIMITY DETECTION FOR A BEAMFORMING TRANSCEIVER

CROSS-REFERENCE TO RELATED APPLICATIONS

This application is a national phase entry of International Application No. PCT/FI2021/050709, filed Oct. 22, 2021, which claims priority to Finnish Application No. 20206126, filed Nov. 6, 2020, the contents of which are hereby incorporated by reference in their entirety.

TECHNICAL FIELD

Various example embodiments relate to wireless communications.

BACKGROUND

As the number of online services increases every year, the need for bandwidth is insatiable. The millimeter-wave (mmW) spectrum as well as the higher frequencies of the super high frequency (SHF) frequency range offer the possibility of using large portions of contiguous bandwidth to address high-throughput applications. To compensate for the high pathloss at the aforementioned frequencies, 5G antenna arrays are expected to provide a gain of at least around 10 dB at the User Equipment (UE) and at least around 20 dB at the Base Station (BS). However, operating at high frequencies with high gain panels raises concerns for the health of the users. Therefore, governmental exposure guidelines are in place to regulate the maximum allowed transmit power on the UE. Since frequencies below 100 GHz are non-ionizing, the concern for health is limited to thermal heating of the body tissue while absorbing electromagnetic energy. To comply with the governmental exposure guidelines, the UE may have to reduce its output power if the distance between the user and the active panel gets too small. Thus, a 5G UE supporting mmWave/high-SHF operation must be capable of detecting whether a user is near its antenna array. Thus, there is a need for efficient solutions for dynamically detecting the proximity of the user to an antenna array of a UE.

BRIEF DESCRIPTION

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which

FIGS. 4 and 5 illustrate processes according to embodiments;

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), Internet Protocol multimedia subsystems (IMS) and passive optical networks (PON) or any combination thereof.

Unless otherwise stated, the term "beam" as used in this application corresponds to the main beam (of an antenna array).

Figures 1, 2A, 2B:
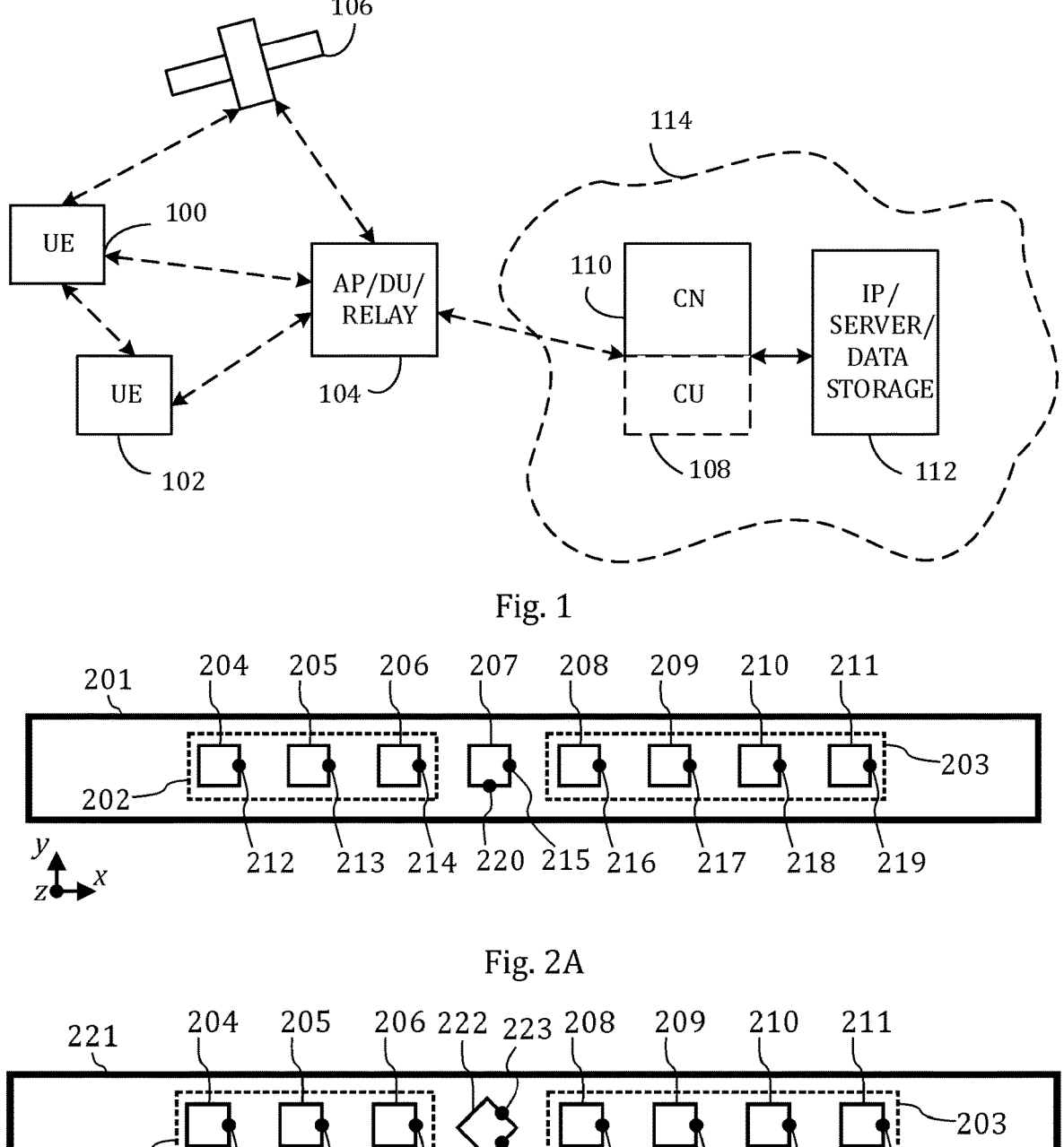
FIG. 1 illustrates an exemplary wireless communication system according to embodiments.
FIGS. 2A and 2B illustrate antenna arrays according to embodiments.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/ outdoor small cell (a micro, femto, or a pico cell). The physical link from a user device to a (e/g)NodeB is called uplink or reverse link and the physical link from the (e/g) NodeB to the user device is called downlink or forward link. It should be appreciated that (e/g)NodeBs or their function- alities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a com- puting device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forward- ing user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allo- cated and assigned, and thus any feature described herein with a user device may be implemented with a correspond- ing apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, per- sonal digital assistant (PDA), handset, device using a wire- less modem (alarm or measurement device, etc.), laptop and/or touch screen computer, tablet, game console, note- book, and multimedia device. Each user device may com- prise one or more antennas. It should be appreciated that a user device may also be a nearly exclusive uplink only device, of which an example is a camera or video camera loading images or video clips to a network. A user device may also be a device having capability to operate in (Indus- trial) Internet of Things ((I)IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or appa- ratuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical sys- tems, in which the physical system in question has inherent mobility, are a subcategory of cyber-physical systems. Examples of mobile physical systems include mobile robot- ics and electronics transported by humans or animals.

Additionally, although the apparatuses have been depicted as single entities, different units, processors and/or memory units (not all shown in FIG. 1) may be implemented.

5G enables using (massive) multiple input-multiple out- put ((m)MIMO) antennas (each of which may comprise multiple antenna elements), many more base stations or nodes than the LTE (a so-called small cell concept), includ- ing macro sites operating in co-operation with smaller stations and employing a variety of radio technologies depending on service needs, use cases and/or spectrum available. A MIMO antenna (comprising a plurality of antenna elements) may be equally called a MIMO array antenna, a MIMO antenna array or a MIMO phased array (comprising a plurality of antennas or antenna elements). 5G mobile communications supports a wide range of use cases and related applications including video streaming, aug- mented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface oper- ability, such as below 6 GHz-cmWave, below 6 GHz- cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distrib- uted in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscrib- ers for faster response time. Edge computing covers a wide range of technologies such as wireless sensor networks, mobile data acquisition, mobile signature analysis, coopera- tive distributed peerto-peer ad hoc networking and process- ing also classifiable as local cloud/fog computing and grid/ mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communica- tions (autonomous vehicles, traffic safety, real-time analyt- ics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As the number of online services increases every year, the need for bandwidth is insatiable. The millimeter-wave (mmW) spectrum (equally called extremely high frequency (EHF) range) as well as the higher frequencies of the super high frequency (SHF) frequency range (e.g., 20-30 GHz) offer the possibility of using large portions of contiguous bandwidth to address high-throughput applications. To compensate for the high pathloss at millimeter wave or high-SHF frequencies (that is, high relative to lower radio frequencies), 5G antenna arrays (or panels) may be expected to provide a gain of at least approximately 10 dB at the terminal device (equally called User Equipment, UE) and at least around 20 dB at the access node (equally called a Base Station, BS). However, operating at high frequencies with high gain raises concerns for the health of the users of the terminal devices. Therefore, governmental exposure guidelines are in place to regulate the maximum allowed transmit power on the terminal device. Since frequencies below 100 GHz are non-ionizing, the concern for health is limited to thermal heating of the body tissue while absorbing electromagnetic energy.

The Maximum Permissible Exposure (MPE) defines a limit for safe exposure to electromagnetic radiation of a certain frequency. The MPE may be given as a power density (PD) value (or specifically as a value of plane-wave equivalent power density). For example, the Federal Communications Commission (FCC) has set the threshold for MPE to 10 W/m² (1 mW/cm²), for the general public, in the frequency range of 6-100 GHz. The energy absorbed by the human body increases as the distance to the terminal device (or specifically to the antenna array therein) decreases. Therefore, to comply with the MPE limit, the terminal device may have to reduce its output power if the distance between the user and the active antenna array gets too small. Because of these FCC regulations (and other such regulations), a 5G terminal device supporting mmWave/high-SHF operation must be capable of detecting whether a user of the 5G terminal device is near the antenna array of the 5G terminal device and to adjust the transmitted power level accordingly (i.e., to implement a proximity-dependent MPE power back-off solution).

The level of intelligence of the proximity-dependent MPE power back-off implementation will directly depend on the capability of the used proximity sensors. In general, there are two types of proximity sensors static and dynamic.

Static proximity sensors are calibrated to detect a predetermined fixed distance (for example, 14 cm) and the needed MPE power back-off will be applied when a user (or other obstruction) is detected within that distance. A terminal device equipped with such a sensor may apply full power amplifier (PA) power back-off already at the calibrated proximity detection distance. The full power amplifier (PA) power back-off may correspond, here, to maximum power back-off value (and thus minimum transmitted power) for the worst-case scenario (i.e., user touching the array).

A dynamic proximity sensor is able to detect the physical distance between the antenna array and the user (or other obstruction). Terminal devices with such dynamic proximity sensors may thus be able to also dynamically adjust the PA back-off power as the distance to the user changes and thereby keep the effective isotropic radiated power (EIRP) of the terminal device at the maximum allowed level set by a relevant (FCC) regulation.

Each mmWave antenna array of the terminal device may require a separate proximity sensor. This leads to an increase in the space (i.e., volume) needed for the case of the terminal device as both the antenna array and the proximity sensor need to be accommodated. For high usability of the terminal device, the overall size of the terminal device should, however, be kept relatively small.

Embodiments seek to overcome at least some of the problems discussed above by providing a dynamic solution for detecting a user approaching the antenna array and optimizing the required power back-off accordingly. Specifically, the embodiments are based on the idea of utilizing at least one dual-polarized antenna element of the terminal device, forming a part of the antenna array of the terminal device or a separate element, as a radar receiver or a radar sensor element for dynamic proximity detection by using the electromagnetic waves transmitted by the remaining antenna elements of the terminal device during normal operation as the radar transmission (Tx) signal. Thus, no new radar reference signals (overhead) are required. Specifically, the electromagnetic waves transmitted by the terminal device may correspond to common 3GPP specified signals comprising control signals (e.g., physical uplink control channel, PUCCH, signals), data signals (e.g., physical uplink shared channel, PUSCH signals) and/or reference signals (e.g., periodic sounding reference signals, SRS-P).

FIGS. 2A and 2B illustrates two alternative antenna arrays according to embodiments. The illustrated antenna arrays are specifically linear microstrip antenna arrays (though other type of antenna arrays may be employed in other embodiments). Specifically, FIGS. 2A and 2B illustrate a view "from above", that is, from a broadside direction of the antenna array. In FIGS. 2A and 2B, the microstrip antenna arrays are arranged along the xy-plane with the array axis of the microstrip antenna array extending along the x-direction. The illustrated microstrip antenna arrays may be antenna arrays for a RF front end of a beamforming transmitter or transceiver. Said beamforming transmitter or transceiver may be comprised specifically in a terminal device such as in any of the terminal devices 100, 102 of FIG. 1. Dashed line is used in FIGS. 2A and 2B to denote certain (sub)sets of antenna elements and thus do not correspond to any physical structure.

Referring to FIG. 2A, the antenna array 201 comprises multiple antenna elements 204 to 211. In this embodiment, all antenna elements in the antenna array 201 have equal geometry, dimensions and orientation. Spacings between adjacent antenna elements in the antenna array 201 are equal. In the illustrated example, the antenna array 201 is specifically a linear microstrip antenna array comprising eight antenna elements 204 to 211 each of which is a square patch antenna. In other words, each antenna element 204 to 211 is printed on a printed circuit board (PCB) comprising a conductive ground plane (not shown in FIG. 2A), a non-conductive substrate and a patterned conductive layer forming said plurality of antenna elements 204 to 211. Due to the rather narrow form factor of many typical terminal devices (namely, smart phones and tablet computers), linear arrays are often preferred.

Each antenna element 204 to 211 may be configured to operate at at least one frequency band. Said at least one frequency band may comprise at least one frequency band within the SHF/EHF frequency range (i.e., 3-300 GHz). In some embodiments, said at least one frequency band may comprise at least one frequency band within the frequency range of 10 to 300 GHz. In some embodiments, said at least one frequency band may comprise the so-called frequency band 2 (FR2) defined as 24250 MHz-52600 MHz. If patch antenna elements, as in FIG. 2A, or other resonant antenna elements are employed, dimensions of each antenna element 204 to 211 may be selected so that a fundamental ($\lambda/2$, $\lambda$ being the wavelength) resonance frequency of each antenna element 204 to 211 is within at least one of said at least one frequency band.

The antenna array 201 may specifically comprise a plurality of antenna elements 204 to 206, 208 to 211 for beamforming transmission (that is, at least for transmission) and at least one (radar sensor) antenna element 207 for reception. In the illustrated example, said at least one antenna element 207 consists of a single antenna element. In some embodiments, said at least one (radar sensor) antenna element 207 may also be configurable for beamforming transmission when it is not used for radar reception. Said plurality of antenna elements 204 to 206, 208 to 211 may be configured for providing conventional phased array operation at least in transmission (for transmitting conventional 5G NR uplink control/data signals). In other words, the plurality of antenna elements 204 to 206, 208 to 211 may be configured to be fed with signals having different relative phases so as to form a certain desired transmission beam (i.e., a transmission beam steered to a certain desired direction) according to conventional beamforming principles. On the other hand, said at least one antenna element 207 may be configured for receiving electromagnetic waves transmitted by the plurality of antenna elements 204 to 206, 208 to 211 and subsequently reflected from an obstruction (e.g., a user of a terminal device comprising the antenna array 201) to said at least one antenna element 207. In other words, said at least one antenna element 207 is configured to provide radar receiver operation with the signals transmitted by the plurality of antenna elements 204 to 206, 208 to 211 acting as the transmitted radar signals, as mentioned above.

The plurality of antenna elements 204 to 206, 208 to 211 for beamforming transmission may form at least two sub-arrays 202, 203 surrounding said at least one antenna element 207 from each side. Said at least two subarrays 202, 203 may or may not have equal number of antenna elements and may each comprise at least one antenna element. In general, said at least one antenna element 207 may be arranged centrally in the antenna array 201. Such central placement has the benefit of keeping the antenna aperture of the combined transmission signal unchanged for maximum antenna gain and eliminate the risk of the user blocking the receiver patch without detection (meaning a user only covers outer element(s) of the antenna array).

Each of the plurality of antenna elements 204 to 206, 208 to 211 may be configured to transmit electromagnetic waves of a first polarization (e.g., a horizontal or vertical polarization and/or co- or cross-polarization). To achieve this operation, each of the plurality of antenna elements 204 to 206, 208 to 211 may be fed, in an identical manner, at least from a first feed point 212 to 214, 216 to 219 arranged on or near an edge of a corresponding antenna element (preferably, centrally in a direction along said edge). The term "near an edge" may mean here that the first feed point is at least closer to the edge than to the center of the patch antenna. Optionally, one or more further feed points may be provided for the plurality of antenna elements 204 to 206, 208 to 211 for enabling transmission of other polarizations. A feed point may be equally called an antenna port or a feed port.

An electromagnetic wave may change its polarization upon a reflection from an object (e.g., a user). For example, the polarization may be changed due to reflection from a purely linear polarization (e.g., horizontal polarization) to a (slightly) elliptical polarization or the orientation of the linearly polarized electromagnetic wave defined by the direction of the electric field vector may be shifted (i.e., rotated). The potential change in the polarization may depend, for example, on the geometry, orientation, material properties or surface properties (e.g., surface roughness) of the object (or objects) causing the reflection. Receiving in both polarizations ensures that a reflected signal is always fully detected. This capability is especially important when dealing with regulation compliance (like MPE for FCC) since, in that case, object detection needs to be guaranteed by the proximity sensor (i.e., by the radar implemented with the antenna array 201).

In order to provide the capability of receiving the reflected radar signal originating from the plurality of antenna elements 204 to 206, 208 to 211 in both polarizations, each of said at least one antenna element 207 for reception is a dual-polarized antenna element, that is, an antenna element capable of producing/receiving electromagnetic waves of two different (preferably orthogonal) polarizations. To this end, two different feed points 215, 220 may be provided for each of said at least one antenna element 207: a first feed point 215 for reception (and transmission) of electromagnetic waves of said first polarization and a second feed point 220 for reception (and transmission) of a second polarization (orthogonal to the first polarization or at least different to it).

In some embodiments, said at least one antenna element 207 may be specifically configured to receive both co-polarized and cross-polarized signals. According to a general definition, co-polarization is defined as the polarization the antenna (here, the plurality of antenna elements 204 to 206, 208 to 211 of the antenna array 201) is meant to radiate, while cross-polarization is defined as a polarization orthogonal to the co-polarization.

As shown in FIG. 2A, the first feed point 215 of said at least one antenna element corresponds to the first feed points 212 to 214, 216 to 219 of the plurality of antenna elements 204 to 206, 208 to 211 for beamforming transmission. In the case of a square patch antenna, orthogonal polarizations may be produced/received when the first and second feed points are arranged on or near two adjacent edges of the patch antenna, as shown in FIG. 2A. The first polarization may correspond, for example, to one of horizontal polarization and vertical polarization and the second polarization may correspond to other one of horizontal polarization and vertical polarization.

In some embodiments, said plurality of antenna elements 204 to 206, 208 to 211 may be fed, in an identical manner, also from a second feed point (similar to as illustrated for said at least one antenna element 207) for enabling beamforming transmission and reception of electromagnetic waves of two different (orthogonal) linear polarizations (e.g., horizontal and vertical linear polarizations). An example of such a scenario is discussed later in connection with a RF front end of FIG. 3.

The feeding of a microstrip antenna 204 to 211 via the first/second feed point 212 to 219, 220 may be implemented, for example, using a microstrip transmission line (optionally with an inset) printed on the same PCB as the microstrip antenna in question or using a coaxial cable (with the outer conductor of the coaxial cable being connected to the ground plane of the microstrip antenna and the inner conductor being connected, through the substrate, to the first feed point). In some embodiments, a matching circuit may be provided between a transmission line (e.g., a microstrip transmission line or a coaxial cable) and the antenna element for improved impedance matching.

In the illustrated example, said first and second polarizations are linear polarization though, in other embodiments, said at least one antenna element 207 may be configured to receive two different (optionally orthogonal) circular polarizations (e.g., left- and right-handed polarizations) or two different (optionally orthogonal) elliptical polarizations may be employed. Correspondingly, the plurality of antenna elements 204 to 206, 208 to 211 may, in this case, be configured to produce a circular or elliptical polarization.

The embodiments discussed in connection with FIG. 2A may specifically be employed in connection with sequential radar measurements of the first and second polarizations (as opposed simultaneous reception of the first and second polarizations) as high isolation of the combined transmission signal produced by the plurality of antenna elements 204 to 206, 208 to 211 towards the first and second feed points 215, 220 of said at least one antenna element 207 may be difficult (or practically impossible) to obtain due to the asymmetry of the first and second feed points 215, 220 of said at least one antenna element 207 relative to the first feed points 212 to 214, 216 to 219 of the plurality of antenna elements 204 to 206, 208 to 211. In other words, the electromagnetic waves of the first polarization transmitted by the plurality of antenna elements 204 to 206, 208 to 211 couple, regardless of the beamforming configuration used, strongly to said at least one antenna element 207 through one of the first and second feed points 215, 220. To this end, the first and second feed points 215, 220 of said at least one dual-polarized antenna element 207 may be electrically connected to a switch enabling switching between the two received signals corresponding to the first and second polarizations (see FIG. 3 for more details). Different antenna array configurations (i.e., different phase shifting for different antenna elements) may be employed in the two sequential measurements to optimize the isolation, as will be described in connection with FIGS. 4, 6A, 6B and 6C.

The antenna array 221 illustrated in FIG. 2B corresponds to a large extent to the antenna array 201 of FIG. 2A. Namely, the antenna array 221 comprises elements 202 to 206, 208 to 214, 216 to 219 discussed above in connection with FIG. 2A (and are thus not discussed here again for brevity).

The difference between the antenna arrays 201, 221 of FIGS. 2A and 2B lies in said at least one (dual-polarized) antenna element 207, 222 implementing the radar sensor functionality. Similar to FIG. 2A, in the illustrated example of FIG. 2B, said at least one antenna element 222 consists of a single antenna element. In FIG. 2B, said at least one antenna element 222 is rotated by 45° compared to said at least one antenna element 207 of FIG. 2A and thus also compared to the plurality of antenna elements 204 to 206, 208 to 211 for beamforming transmission. The (first and second) feed points 223, 224 of said at least one antenna element 222 have also been rotated accordingly by 45°. In other words, an orientation of said at least one antenna element 222 corresponds to an orientation of the plurality of antenna elements 204 to 206, 208 to 211 rotated by 45° around a rotation axis arranged in a center of a corresponding antenna element and pointing to a broadside direction (+z-axis in FIG. 2B) of the antenna array 221. In the case of a microstrip antenna array, said rotation axis is perpendicular to the plane of the microstrip antenna array (i.e., the xy-plane in FIG. 2B). Further, the first feed points 212 to 214, 216 to 219 of the plurality of antenna elements 204 to 206, 208 to 211 correspond to one of the first and second feed points 223, 224 of said at least one antenna element 222 rotated by 45° around said rotation axis.

Due to this rotation, the polarization of the electromagnetic waves transmitted by the plurality of antenna elements 204 to 206, 208 to 211 does not correspond directly to either of the two polarizations associated with the first and second feed points 223, 224 of said at least one antenna element 222, but is separated from both of them by 45°. In other words, direction of the electric field of the electromagnetic waves transmitted by the plurality of antenna elements 204 to 206, 208 to 211 is separated by 45° from the two orthogonal directions of the electric field enabling optimal coupling to the first and second feed points 223, 224 of said at least one antenna element 222. This configuration provides the benefit that high isolation of the combined transmission signal produced by the plurality of antenna elements 204 to 206, 208 to 211 towards the first and second feed points 223, 224 of said at least one antenna element 222 may be achieved simultaneously (with a single beamforming configuration). This is due to the symmetrical orientation of said at least one antenna element 222 and the first and second feed points 223, 224 of said at least one antenna element 222 relative to the plurality of antenna elements 204 to 206, 208 to 211 and their first feed points 212 to 214, 216 to 219.

In other words, if the first and second feed points 223, 224 of said at least one antenna element 222 are associated with first and second polarizations, the first feed points 212 to 214, 216 to 219 of the plurality of antenna elements 204 to 206, 208 to 211 are associated with a third polarization which corresponds to a linear combination of the first and second polarizations (preferably, to an equal or a substantially equal linear combination of the first and second polarizations). Thus, the electromagnetic waves of a third polarization transmitted by the plurality of antenna elements 204 to 206, 208 to 211 couple equally to the first and second feed points 223, 224 of said at least one antenna element 222.

Apart from the orientation of said at least one antenna element 222, said at least one antenna element 222 may be defined as discussed above in connection with said at least one antenna element 207 of FIG. 2A. For example, said at least one antenna element 222 may still have equal geometry and equal dimensions with the plurality of antenna element for beamforming transmission 204 to 206, 208 to 211 and the antenna array 221 has equal spacing.

While a 45° rotation may provide the highest isolation (at least in most cases) due to the perfect symmetry it provides, in some embodiments the rotation angle may also differ from 45°. In general, the rotation angle may be any (non-zero) angle. In some embodiments, the rotation angle may be, for example, defined to be selected from a range of 40°-50° or from a range of 30°-60° or from a range of 20°-70° or from a range of 10°-80°.

The embodiments discussed in connection with FIG. 2B may specifically be employed in connection with simultaneous radar measurements of the first and second polarizations (as opposed sequential reception of the first and second polarizations though this is also possible). The reason for this is that high isolation of the combined transmission signal produced by the plurality of antenna elements 204 to 206, 208 to 211 towards the first and second feed points 223, 224 of said at least one antenna element 222 may be achieved, in this case, due to the symmetric orientation. To this end, the first and second feed points 223, 224 of said at least one dual-polarized antenna element 222 may be electrically connected to a combiner enabling combining the two signals received via the first and second feed points 223, 224 corresponding, respectively, to the first and second polarizations (see FIG. 3 for more details).

While the antenna arrays 201, 221 illustrated in FIGS. 2A and 2B are linear antenna arrays, in other embodiments, other antenna array configurations may be employed. For example, the antenna array may be a rectangular array (i.e., N×M array, where N and M are integers larger than one). In such embodiments, said at least one antenna element 207, 222 may be arranged centrally within the antenna array or at least so that said at least one antenna element do not comprise any edge antenna elements of the antenna array.

Moreover, while the antenna arrays 201, 221 illustrated in FIGS. 2A and 2B employed rectangular patch antennas, other type or types of antenna elements may be employed in other embodiments. For example, microstrip antennas having non-square shape, multilayer microstrip antennas and/or (crossed-)dipole antennas may be employed. In some embodiments, the geometry and/or dimensions of the plurality of antenna elements may differ from the geometry and/or dimensions of said at least one antenna element. In such embodiments, the operational frequency range may still be (substantially) the same for all antenna elements so that said at least one antenna element for radar reception is still capable of receiving signals originating from the plurality of antenna elements for beamforming transmission. For example, the plurality of antenna elements may be rectangular (non-square) patch antennas while said at least one antenna element may be square patch antennas. In such embodiments, the rectangular patch antennas and the square patch antenna(s) may have an equal resonant length associated with the first feed point. In some embodiments, one or more of said at least one antenna element for radar reception and the plurality of antenna elements for beamforming transmission may be multi-resonant antenna elements.

FIGS. 2A and 2B illustrate scenarios where said at least one antenna element 207, 222 implementing the radar receiver operation forms a part (or an integral part such as being printed on the same PCB) of the antenna array 201, 221 of a RF front end of a beamforming transmitter or transceiver of the terminal device. Integrating the radar sensor antenna element(s) into the radar front end make it cheaper and reduce the additional needed foot print (size), but it will also be more difficult to obtain the required isolation between the transmitted and the reflected signal, due to the small distance between the two RF paths (crosstalk). However, in other embodiments, said at least one antenna element may correspond to a separate unit or component, i.e., a separate antenna element (if said at least one antenna element includes only a single antenna element) or a separate antenna array (if said at least one antenna element comprises multiple antenna elements), from any antenna array of the RF front end used for conventional beamforming transmitter and/or receiver operation. For example, said at least one antenna element may be a microstrip antenna printed on a separate PCB from the antenna array(s) of the beamforming transceiver or transmitter. The limitations regarding geometry, dimensions and/or orientation of said at least one antenna element relative to the antenna array discussed above may apply equally when said at least one antenna element is a separate entity from the antenna array used for beamforming.

Figure 3:
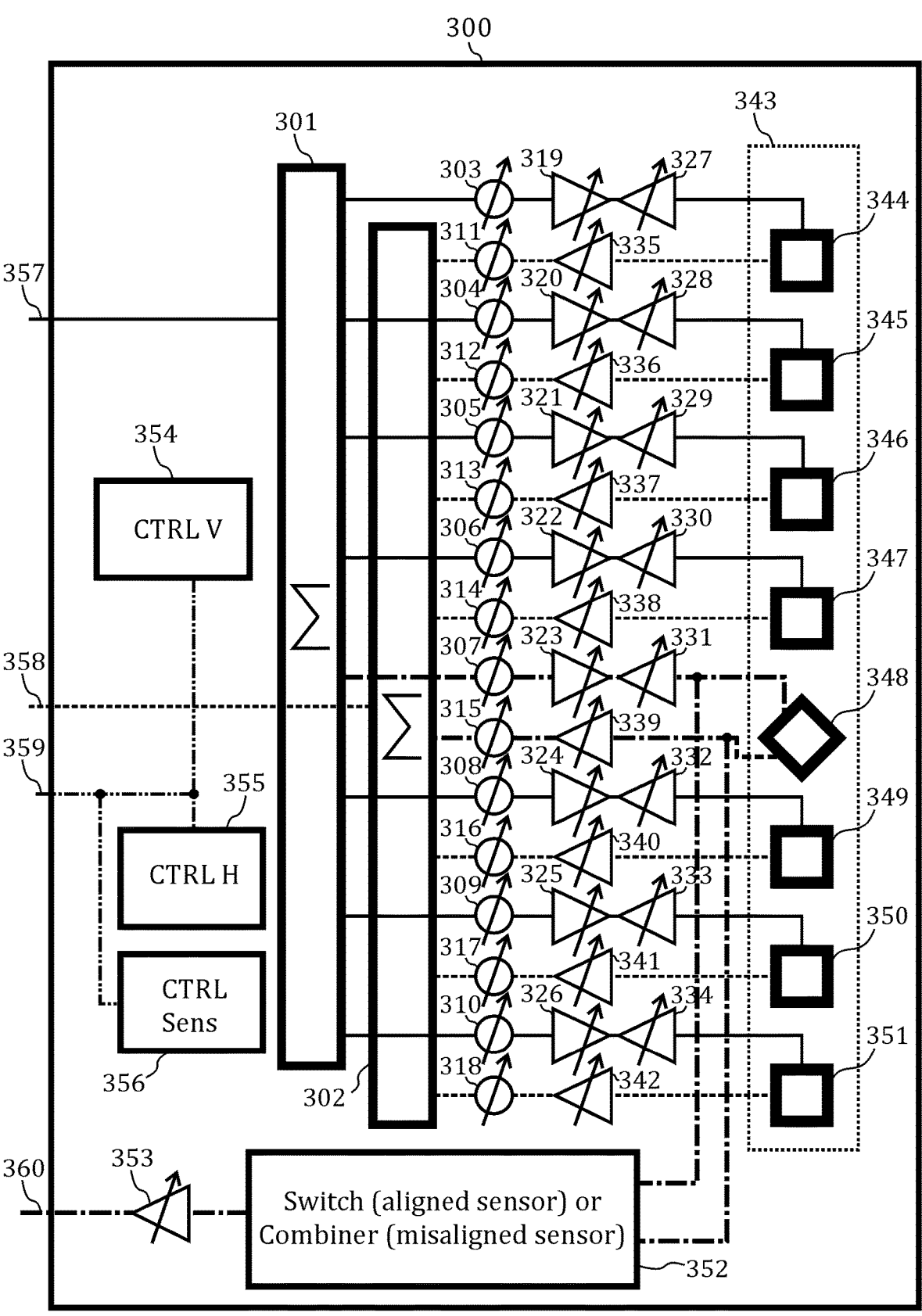
FIG. 3 illustrates radio frequency front-end according to embodiments.

FIG. 3 illustrates a RF front end for a beamforming (or MIMO) transceiver according to embodiments. Specifically, the RF front end of FIG. 3 is a RF front end configured to transmit electromagnetic signals using a third polarization (e.g., a vertical polarization or co-polarization) and receive electromagnetic signals using said third polarization and a fourth polarization (e.g., a horizontal polarization or cross-polarization) which may be orthogonal to the third polarization (or at least different from the third polarization). The RF front-end of FIG. 3 is further configured to implement the radar sensor functionality according to embodiments using first and second polarizations being orthogonal to each other. The apparatus illustrated in FIG. 3 may be comprised in a terminal device such as any of the terminal devices 100, 102 of FIG. 1.

In FIG. 3, connections relating to the beamforming transmission/reception using the first polarization are illustrated with a solid line while connections relating to the beamforming reception using the second polarization are illustrated with a dashed line. Connections relating to implementing the radar sensing functionality (i.e., radar-like proximity sensor functionality) according to embodiments are illustrated with a thick dash-dotted line while control signaling connections are illustrated with a dashed-double-dotted line. Contacts between connections are illustrated explicitly with dots. Thus, overlapping of lines without a dot illustrates a non-contact (unless otherwise explicitly stated below). Moreover, the lines shown going through the first and second (RF) divider/combiner elements 301, 302 (i.e., overlapping the first and second (RF) divider/combiner elements 301, 302) do not imply any connection to said first and second (RF) divider/combiner elements 301, 302.

Referring to FIG. 3, the illustrated RF front end architecture 300 comprises an antenna array 343. Said antenna array 343 comprises a plurality of antenna elements 344 to 347, 349 to 351 for beamforming transmission/reception and at least one antenna element 348 for reception of signals transmitted by the plurality of antenna elements 344 to 347, 349 to 351 and subsequently reflected from obstructions to said at least one antenna element 348. In other words, said at least one antenna element 348 is configured to implement the radar receiver functionality described above. In FIG. 3, it is assumed that all the antenna elements 344 to 351 of the antenna array 343 are dual-polarized antenna elements.

Said at least one antenna element 348 may comprise at least two feed points for receiving electromagnetic signals of two orthogonal (or at least different) polarizations (in the illustrated example, one of the two feed points may also be used for transmission). While the antenna element 348 is illustrated specifically as a rotated antenna element similar to FIG. 2B, the antenna array 343 may, in general, correspond either to the antenna array 201 of FIG. 2A or to the antenna array 221 of FIG. 2B or to any alternative antenna arrays according to embodiments discussed in connection with FIGS. 2A and/or 2B. In other words, the following discussion applies, mutatis mutandis, in the case of an antenna array as discussed in connection with FIG. 2A (though, e.g., the third and fourth polarizations as mentioned below correspond, in such cases, to the first and second polarization).

Said plurality of antenna elements 344 to 347, 349 to 351 may at least comprise one feed point for transmitting electromagnetic signals of one of a first and second polarization associated with said at least one antenna element 348 or of a third polarization (as discussed in connection with FIGS. 2A and 2B). In the illustrated example, said plurality of antenna elements 344 to 347, 349 to 351 are dual-polarized antenna elements, that is, they comprise two feed points for transmitting electromagnetic signals of two orthogonal (or at least different) polarizations (i.e., third and fourth polarizations), where one of said two feed points is used also for reception.

It should be noted that, in some alternative embodiments, said plurality of antenna elements 344 to 347, 349 to 351 may be used for both beamforming transmission and reception using both third and fourth polarizations. This would require introducing an additional power amplifier to each of the RF receiver branches in FIG. 3 (e.g., introducing a power amplifier to the RF receiver branch defined by the elements 311, 335).

Each antenna element of said plurality of antenna elements 344 to 347, 349 to 351 (or at least some of them) is electrically connected to at least one RF transmitter or transceiver chain for performing beamforming using said third polarization. In the illustrated example, each antenna element 344 to 347, 349 to 351 is electrically connected specifically to a RF transceiver chain (i.e., a combination of a RF transmitter chain and a RF receiver chain) for the third polarization as well as to a RF receiver chain for the fourth polarization, as illustrated with elements 303 to 306, 308 to 314, 316 to 322, 324 to 330, 332 to 334. It should be emphasized that any RF receiver chains (and any RF receiver parts of RF transceiver chains) may be considered optional for the functioning of the embodiments.

In the following, said RF transceiver and receiver chains are discussed for a first antenna element 344 for simplicity of notation. Said discussion applies equally to any of the plurality of antenna elements 344 to 347, 349 to 351 (and optionally also for the antenna element 348).

The first antenna element 344 is connected via a first feed point to a first RF transceiver chain for the third polarization illustrated with elements 303, 319, 327. Specifically, the first RF transceiver chain comprises a first tunable phase shifter 303 for tuning the phase of the signal to be transmitted via the first feed point of the first antenna element 344 or the phase of the signal received via the first feed point of the first antenna element 344 so as to form a desired transmission or reception beam (having the first polarization) with the antenna array 343. Moreover, the first RF transceiver chain may comprise a tunable power amplifier 319 for amplifying the signal to be transmitted via the first feed point of the first antenna element 344 and an electrically tunable low-noise amplifier 327 for amplifying the signal received via the first feed point of the first antenna element 344. Additionally, the first RF transceiver chain may comprise one or more switches (not shown in FIG. 3 for simplicity of presentation) for switching between transmission (i.e., the electrically tunable power amplifier 319) and reception (i.e., the electrically tunable low-noise amplifier 327). It should be noted that while the amplifiers 319, 327 are shown to be in series in FIG. 3 for simplicity of presentation, in actuality they may be arranged in parallel to each other. The appropriate parallel branch for transmission or reception may be selected with a switch or a pair of switches. In some embodiments, the first RF transceiver chain may be replaced with a corresponding RF transmitter chain (especially if said at least one antenna element implementing the radar sensing functionality does not form a part of the antenna array 343).

Moreover, the first antenna element 344 is connected via a second feed point of the first antenna element 344 to a first RF receiver chain for the fourth polarization illustrated with elements 311, 335. Specifically, the first RF receiver chain comprises a second tunable phase shifter 311 for tuning the phase of the signal received via the second feed point of the first antenna element 344 so as to form a desired reception beam (having the second polarization) with the antenna array 343. Moreover, the first RF receiver chain comprises an electrically tunable low-noise amplifier 335 for amplifying the signal received via the second feed point of the first antenna element 344.

The RF transceiver chains are connected electrically to a first (RF) divider/combiner element 301 (equally called a power splitter/combiner element). In reception, signals outputted by the RF transceiver chains are combined in the first divider/combiner element 301 while, in transmission, the signal to be transmitted is split, in the first divider/combiner element 301, into multiple (identical) signals which are fed to the RF transceiver chains. Similarly, the RF receiver chains are connected electrically to a second (RF) divider/combiner element 302. While the second divider/combiner element 302 is not required to provide any divider functionality, in practice, most combiner circuits act in a reciprocal manner and thus enable both dividing and combining. In reception, signals outputted by the RF receiver chains are combined in the second divider/combiner element 302. The first divider/combiner element 301 may be electrically connected via a first input/output 357 of the RF front end 300 to further transceiver (or in some embodiments, transmitter) processing stages implementing, for example, frequency mixing, intermediate frequency processing, digital-to-analog and/or analog-to-digital conversion and/or baseband processing. Here and in the following, an input/output may be equally called an interface or an input/output port. Similarly, the second RF divider/combiner element 302 may be electrically connected via a second input/output 357 of the RF front end 300 (equally called a second interface or a second input/output port) to further receiver processing stages implementing, for example, frequency mixing, intermediate frequency processing and/or analog-to-digital conversion and/or baseband processing.

While said at least one antenna element 348 used for implementing the radar sensing functionality is illustrated as being rotated relative to the other antenna elements 344 to 347, 349 to 351 in FIG. 3, said at least one antenna element 348 may, in general, be oriented in alignment with the other antenna elements 344 to 347, 349 to 351 (as in FIG. 2A) or may have an orientation which is rotated by a certain angle (e.g., 45°) compared to the other antenna elements 344 to 347, 349 to 351 (as in FIG. 2B), as mentioned above. Said at least one antenna element 348 may, at least in some embodiments such as the one illustrated in FIG. 3, also be connected similar to the other antenna elements 344 to 347, 349 to 351 of the antenna array 343 to a RF transceiver chain (formed at least by elements 307, 323, 331) and to a RF receiver chain (formed at least by elements 315 and 339). Specifically (and as illustrated in FIG. 3), said connections may be provided, respectively, via first and second feed points of said at least one antenna element 348 corresponding to said first and second polarizations being optionally orthogonal polarizations which are rotated compared to the third and fourth polarizations associated with the plurality of antenna elements 344 to 347, 349 to 351. Alternatively in embodiments where said at least one antenna element 348 is oriented in alignment with the plurality of antenna elements 344 to 347, 349 to 351, said connections may be provided, respectively, via the first and second feed points of said at least one (orientally aligned) antenna element 348 corresponding to said first and second polarizations (the embodiment of FIG. 2A).

To enable the radar functionality, said at least one antenna element 348 may be electrically connected to the element 352 which may correspond to either a switch or a combiner (or a combination of the two). As described above, the switch may be employed, especially in connection with the embodiment of FIG. 2A, for performing sequential measurements of the first and second polarizations (corresponding to the two inputs of the element 352). In other words, during an initial measurement, the switch 352 may be configured to let through only a signal corresponding to one of the first and second polarizations. Thereafter, the same (or corresponding) measurement may be repeated while the switch is configured to let through only a signal corresponding to the other one of the first and second polarizations. In contrast, the combiner 352 may be employed, especially in connection to the embodiment of FIG. 2B (and FIG. 3), for directly combining the signal corresponding to the first and second polarizations (corresponding to the two inputs of the element 352).

The signal outputted by the switch/combiner element 352 may be amplified using a low-noise amplifier 353 which may be specifically an electrically tunable low-noise amplifier 353. The output of the low-noise amplifier 353 (or of the switch/combiner element 352 if no low-noise amplifier is provided) may correspond to a fourth input/output 360 of the RF front end 300 or simply a fourth output 360 of the RF front end 300. The output of the electrically tunable low-noise amplifier 353 may be electrically connected to further (non-RF) reception processing stages of the beamforming transceiver or fully or partly external to the beamforming transceiver. Said further (non-RF) reception processing stage may implement, for example, frequency mixing, intermediate frequency processing, digital-to-analog and/or analog-to-digital conversion and/or baseband processing. The baseband processor of the beamforming transceiver or a dedicated processor may be used for processing, in addition to the signals associated with the beamforming, the digital radar signal. In other words, the baseband processor or the dedicated processor may be employed for detecting a distance of the obstruction causing the reflection from the beamforming transceiver. Compressive sensing (CS) may be employed for extending the minimum detectable distance.

The electrically tunable elements 303 to 318, 319 to 326, 327 to 334, 353 (or at least some of them) may be controlled or tuned using one or more control units. Said one or more control units may also control any switches comprised in the RF front end 300 such as a switch comprised in the element 352 and/or one or more switches for selecting a low-noise amplifier 327 to 334 for reception or a power amplifier 319 to 326 for transmission in the RF transceiver branches. In the illustrated example, three control units 354, 355, 356 are provided for controlling phase shifters 303 to 310 and amplifiers 319 to 326, 327 to 334 associated with beamforming using the third polarization (e.g., vertical polarization), for controlling phase shifters 311 to 318 and amplifiers 335 to 342 associated with beamforming using the fourth polarization (e.g., horizontal polarization) and for controlling the electrically tunable low-noise amplifier 353 for radar-like proximity sensing, respectively. While not explicitly shown in FIG. 3 for simplicity of presentation, the control units 354, 355, 356 may be electrically connected to the elements 303 to 318, 319 to 326, 327 to 334, 353 which they are controlling. The control units 354, 355, 356 themselves may be controlled using control signaling received via a third input/output 359 of the RF front end 300 from a baseband processing unit of the beamforming transceiver (not shown in FIG. 3) or other computing device comprised in or connected to the beamforming transceiver (or transmitter). At least some of the amplifiers 319 to 326, 327 to 342, 353 may be controlled, by the baseband processing unit in communication with the control units 354, 355, 356, at least based on the power level of received signals. The phase shifters 303 to 318 may be controlled, by the baseband processing unit in communication with the control units 354, 355, 356, for forming a desired beam in transmission/reception. Said beamforming procedure may be specifically optimized to ensure high isolation between the plurality of antenna elements 344 to 347, 349 to 351 performing the beamforming and said at least one (radar sensor) antenna element 348, as will be described in connection with FIGS. 4, 5, 6A, 6B, 6C, 7A and 7B.

It should be noted that FIG. 3 may illustrate only some elements and units of a RF front end (namely, elements which may be considered pertinent to the embodiments). In addition to the elements illustrated in FIG. 3, the RF front end may comprise one or more further elements conventionally included in a RF front end. Said further elements may comprise, e.g., one or more of the following elements: a filter, an image rejection filter, a switch and a duplexer.

In some embodiments, said at least one antenna element 348 for radar reception or sensing may also be usable for beamforming transmission and/or reception using the third and/or fourth polarizations when not used for radar reception. This may apply especially when the aligned antenna array configuration of FIG. 2A is employed. In such embodiments, said at least one antenna element 348 may be disconnected from the beamforming transmission and/or reception when the array is used as a radar sensing element (e.g., using one or more switches). Including said at least one antenna element 348 in the plurality of antenna elements used for beamforming has the benefit of increasing the antenna gain. In some embodiments, said at least one antenna element 348 may be included at least in the beamforming reception.

In some embodiments, the radar sensor (or radar reception) functionality may be implemented, instead of connecting the two feed points of said at least one antenna element 348 to the elements 352, 353 as described above, by connecting the two feed points of said at least one antenna element 348 to two parallel RF receiver (or transceiver) chains defined by elements 307, 331 (optionally also element 323) and elements 315, 339, respectively. The phase shifters 307, 315 may also be considered optional, at least in some embodiments, as they are not needed for radar reception. In these embodiments, the conventional receiver elements of the RF front end of the beamforming transceiver (potentially used also for beamforming reception) may be used for receiving the radar signal. However, having a dedicated RF receiver chain (as defined with elements 352, 353) provides the benefit of not being limited by the sampling rate of the beamforming transceiver. The discussion provided in connection with FIG. 3 applies, mutatis mutandis, also for these embodiments.

It should be emphasized that while FIG. 3 illustrates a RF front end implementing both of the aforementioned two options for realizing the radar sensor functionality (i.e., a separate unit formed by the switch/combiner element 352 and the low-noise amplifier 352 connected to the two feed points of said at least one antenna element 348 or two parallel receiver chains of the RF front end 300 connected to the two feed points of said at least one antenna element 348), only one of said options needs to be implemented for realizing the radar reception (or radar sensing) functionalities. However, if said at least one antenna element 348 is to be used, in addition to radar reception, also for beamforming reception, the connection to the two parallel receiver chains of the RF front end 300 is needed.

According to an embodiment, there is provided a beamforming transceiver (or transmitter) comprising the RF front end 300. Said beamforming transceiver or transmitter may further comprise, e.g., one or more of the following elements: a baseband processing unit, a decision feedback equalizer (DFE), a digital-to-analog converter, an analog-to-digital converter, a RF mixer, a local oscillator, a baseband filter, a baseband amplifier, an intermediate frequency (IF) filter, an IF amplifier and a switch.

FIG. 4 illustrates a process according to embodiments for performing proximity detection and transmit power adjustment by a beamforming transceiver or transmitter based on measurements performed using at least one radar sensor antenna element according to embodiments. The illustrated process may be carried out, for example, by a baseband processing unit, a beamforming steering control unit or other computing device comprised in or connected to a beamforming transceiver or transmitter according to embodiments. Specifically, it is assumed here that the RF front end of the beamforming transceiver comprises at least one dual-polarized (radar sensor) antenna element electrically connected to a switch. In other aspects, the RF front end may correspond to any RF front end according to embodiments as discussed above in connection with FIG. 3. Said at least one dual-polarized (radar sensor) antenna element may correspond to any radar sensor antenna elements discussed in connection with FIGS. 2A and 2B (though the aligned orientation of FIG. 2A may be especially applicable here). In the following, the device carrying out the process is called simply a computing device for brevity.

The computing device causes, in block 401, transmitting electromagnetic waves using a first beam formed by applying a first beamforming configuration to a plurality of (electrically) tunable phase shifters of the RF front end (or specifically of a plurality of RF transmitter or transceiver chains of the RF front end). The first beamforming configuration may be specifically optimized for transmission to a first beamforming direction while achieving isolation of a pre-defined level between the plurality of antenna elements used for beamforming and at least one first feed point of said at least one dual-polarized antenna element. In other words, the beamforming is performed so that the antenna gain to said first beamforming direction is slightly compromised so as to improve isolation. The pre-defined level for the isolation may specifically depend on the self-interference cancellation (SIC) capabilities of the RF front end for operating in full duplex mode. The first beamforming configuration (and the first beamforming direction mapped to it) may be maintained in a memory of the computing device. The first beam may correspond, depending on the particular embodiment, to a first or second polarization (supported by said at least one dual-polarized antenna element) or a third polarization different from the first and second polarizations.

A beamforming configuration may correspond, here and in the following, to phase shift settings applied to the plurality of tunable phase shifters of the RF front end. Optionally, the beamforming configuration may also define amplification settings for power amplifiers of the RF front end. A beamforming direction may correspond, here and in the following, to a beamforming angle (in the case of a one-dimensional or linear antenna array) and a pair of beamforming angles (in the case of a two-dimensional antenna array).

The computing device measures, in block 402, a first signal for the first polarization (e.g., a horizontal polarization or a co-polarization) via the switch set to a first position for receiving the first polarization (and via at least one first feed point of said at least one dual-polarized antenna element). Specifically, the computing device may cause setting said switch to said first position before measuring the first signal. An input associated with said first position is electrically connected to at least one first feed point of said at least one dual-polarized antenna element. The first signal corresponds to the electromagnetic waves transmitted using the first beam and subsequently reflected from at least one obstruction towards said at least one dual-polarized antenna element. The actions pertaining to blocks 401, 402 may be carried out substantially simultaneously.

The computing device causes, in block 403, transmitting electromagnetic waves using a second beam formed by applying a second beamforming configuration to the plurality of tunable phase shifters. The second beamforming configuration is optimized for transmission to said first beamforming direction while achieving isolation of a pre-defined level between the plurality of antenna elements and at least one second feed point of said at least one dual-polarized antenna element. The second beamforming configuration (and the first beamforming direction mapped to it) may be maintained in a memory of the computing device. The second beam may correspond to the same polarization as the first beam.

The computing device measures, in block 404, a second signal for the second polarization (e.g., a vertical polarization or a cross-polarization) via the switch set to a second position for receiving the second polarization. Specifically, the computing device may cause setting said switch to said second position before measuring the second signal. An input associated with said second position is electrically connected to at least one second feed point of said at least one dual-polarized antenna element. The second signal corresponds to the electromagnetic waves transmitted using the second beam and subsequently reflected from at least one obstruction towards said at least one dual-polarized antenna element. The actions pertaining to blocks 403, 404 may be carried out substantially simultaneously.

The computing device performs, in block 405, proximity detection based on the first and second signals. Any known (dynamic) proximity detection techniques (or proximity sensing techniques) may be employed. The first and second signals may be combined before the proximity detection or they may be analyzed separately. The proximity detection may be based on evaluating a delay in the received signal(s) or specifically a delay in a particular peak (corresponding to the reflection) in the received signal(s). The distance to the obstruction may be calculated based on said delay(s) (and on the fact that electromagnetic waves propagate at the speed of light).

To improve the minimum detectable distance in the proximity detection (which depends on, e.g., sampling rate and frequency bandwidth of the transmitted signal), so-called compressed sensing (equally called compressive sensing, compressive sampling or sparse sampling) may be employed. Compressive sensing is a technique allowing going beyond the Shannon-Nyquist sampling theorem stating that the sampling rate needs to be at least twice the maximal signal frequency. Using compressive sensing, a sparse signal can be reconstructed from much fewer incoherent measurements than what is required by the Shannon-Nyquist sampling theorem. As the reflected signal in most practical use cases where the beamforming transceiver is comprised in a terminal device (e.g., a smart phone) corresponds to a single Dirac impulse response resulting from a reflection from a hand of a user, the signal to be reconstructed is very sparse and thus very suitable for compressive sensing.

The computing device adjusts, in block 406, transmit power of the radio transceiver based on results of the proximity detection (i.e., based on the detected distance to an obstruction which caused the reflection). The adjustment may be carried out, for example, by adjusting the amplification of the plurality of electrically tunable power amplifiers of the RF front end. The adjustment may be carried out so that a pre-defined safe limit for the transmit power of the RF front end is achieved.

While FIG. 4 illustrates the process specifically for a first beamforming direction, the corresponding process may be carried out for a plurality of beamforming directions. To enable this, the computing device may maintain, in a memory, information on a plurality of first and second beamforming configurations providing high isolation for first and second polarizations, where each pair of first and second beamforming configuration may correspond to a different beamforming direction. In other words, the computing device may maintain information on a plurality of different angular beam entries (each being defined for one of the first and second polarizations) in a beam alignment codebook maintained in the memory.

FIG. 5 illustrates another process according to embodiments for performing proximity detection and transmit power adjustment by a beamforming transceiver or transmitter based on measurements performed using at least one radar sensor antenna element according to embodiments. The illustrated process may be carried out, for example, by a baseband processing unit, a beamforming steering control unit or other computing device comprised in or connected to a beamforming transceiver or transmitter according to embodiments. Specifically, it is assumed here that the RF front end of the beamforming transceiver comprises at least one dual-polarized (radar sensor) antenna element electrically connected to a combiner. In other aspects, the RF front end may correspond to any RF front end according to embodiments as discussed above in connection with FIG. 3. Said at least one dual-polarized (radar sensor) antenna element may correspond to any radar sensor antenna elements discussed in connection with FIGS. 2A and 2B (though the misaligned orientation of FIG. 2B may be especially applicable here). In the following, the device carrying out the process is called simply a computing device for brevity.

The process of FIG. 5 corresponds in many aspects to the process of FIG. 4. Any discussion of these shared aspects provided in connection with FIG. 4 may apply, mutatis mutandis, to the process of FIG. 5, unless otherwise explicitly stated.

The computing device causes, in block 501, transmitting electromagnetic waves using a first beam formed by applying a first beamforming configuration to the plurality of electrically tunable phase shifters. The first beamforming configuration is optimized for transmission to a first beamforming direction while achieving isolation of a pre-defined level between the plurality of antenna elements and said at least one dual-polarized antenna element. The first beam may correspond, depending on the particular embodiment, to a first polarization or a second polarization (supported by said at least one dual-polarized antenna element) or a third polarization different from the first and second polarizations. The third polarization may be preferable in this particular embodiment (this case corresponding to the misaligned antenna configuration of FIG. 2B). In some embodiments, the first beam may specifically correspond to a third polarization which is orthogonal to the first and/or second polarizations supported by said at least one dual-polarized antenna element.

The computing device measures, in block 502, a combined signal comprising first and second polarizations via the combiner. The first and second inputs of the combiner are electrically connected, respectively, to at least one first feed point at least one second feed point of said at least one dual-polarized antenna element. The combined signal corresponds to the electromagnetic waves transmitted using the first beam and subsequently reflected from at least one obstruction towards said at least one dual-polarized antenna element. The actions pertaining to blocks 501, 502 may be carried out substantially simultaneously.

The computing device performs, in block 503, proximity detection based on the measured combined signal. Any known proximity detection techniques (or proximity sensing techniques) may be employed. In general, the proximity detection may be based, e.g., on evaluating the timing (or delay) of the reflected signal component(s) or pulse(s) in the measured combined signal and calculating the distance to the obstruction based thereon (and on the fact that electromagnetic waves propagate at the speed of light). In some embodiments, compressed sensing may be employed.

The computing device adjusts, in block 504, transmit power of the radio transceiver based on results of the proximity detection (i.e., based on the detected distance to an obstruction which caused the reflection). The adjustment may be carried out, for example, by adjusting the amplification of the plurality of electrically tunable power amplifiers of the RF front end. The adjustment may be carried out so that a pre-defined safe limit for the transmit power of the RF front end is achieved.

Similar to as described in connection with FIG. 4, the process of FIG. 5 may be carried out for a plurality of beamforming directions. To enable this, the computing device may maintain, in a memory, information on a plurality of first beamforming configurations providing high isolation for both first and second polarizations simultaneously, where each first beamforming configuration may correspond to a different beamforming direction.

The processes described in connection with either of FIGS. 4 and 5 may be applicable, mutatis mutandis, to the aforementioned alternative where conventional RF front end of a beamforming transceiver is used for radar reception via said at least one dual-polarized antenna element, instead of the dedicated switch or combiner (and optionally a dedicated low-noise amplifier). In such embodiments, the computing device may measure, in blocks 402, 404 of FIG. 4 and/or block 502 of FIG. 5, signals corresponding to the first polarization and/or a second signal corresponding to the second polarization (or a combination thereof) via the two parallel RF receiver chains of the RF front end electrically connected to said at least one dual-polarized antenna element (as opposed to via the dedicated switch or the combiner).

The blocks, related functions, and information exchanges described above by means of FIGS. 4 and 5 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

The solutions according to embodiments discussed above provide many advantageous properties. The solutions may use actual 3GPP specified control (PUCCH), data (PUSCH) or reference (SRS-P) signals as the radar Tx signal. Thus, no new radar reference signals are needed meaning that no additional resources are needed and thus there is no additional overhead. Moreover, the embodiments provide the benefit of low die size due to partial reuse of the existing antenna array. Also, no additional space/volume is needed for fitting proximity sensors. Finally, the solutions according to embodiments provide high isolation between the feed ports used for beamforming and the one(s) used for radar-like proximity sensing.

Figure 6A:
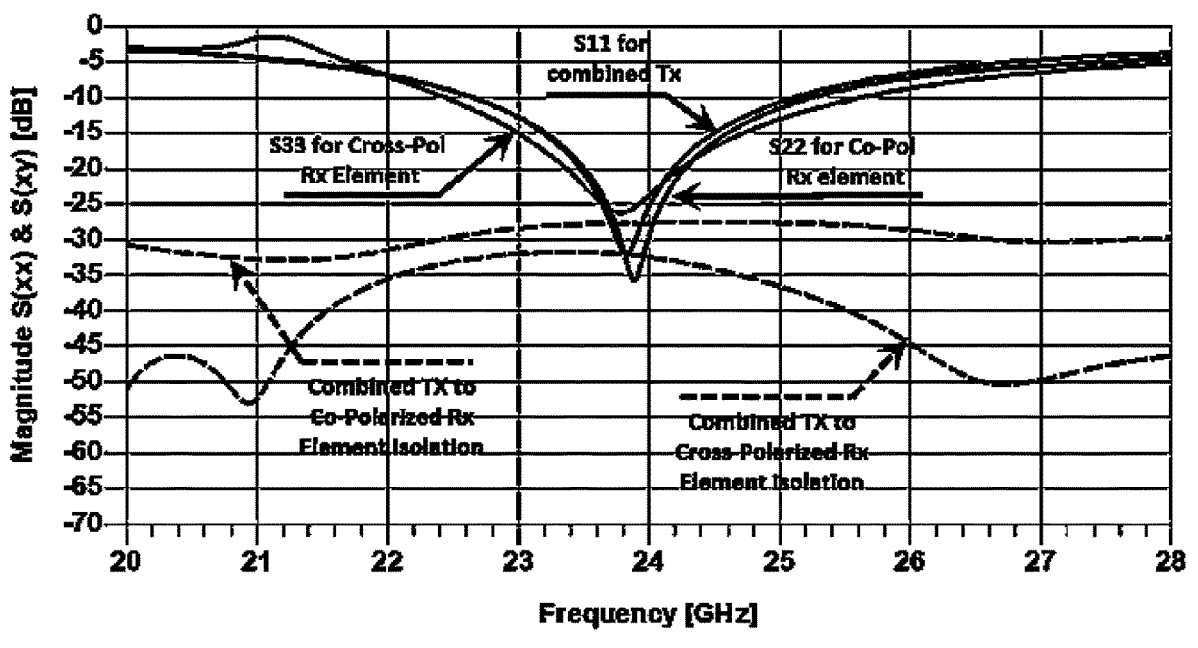
FIGS. 6A, 6B, 6C, 7A and 7B illustrate exemplary S-parameter results achieved using antenna arrays comprising a radar sensor antenna element according to embodiments.
Figure 6B:
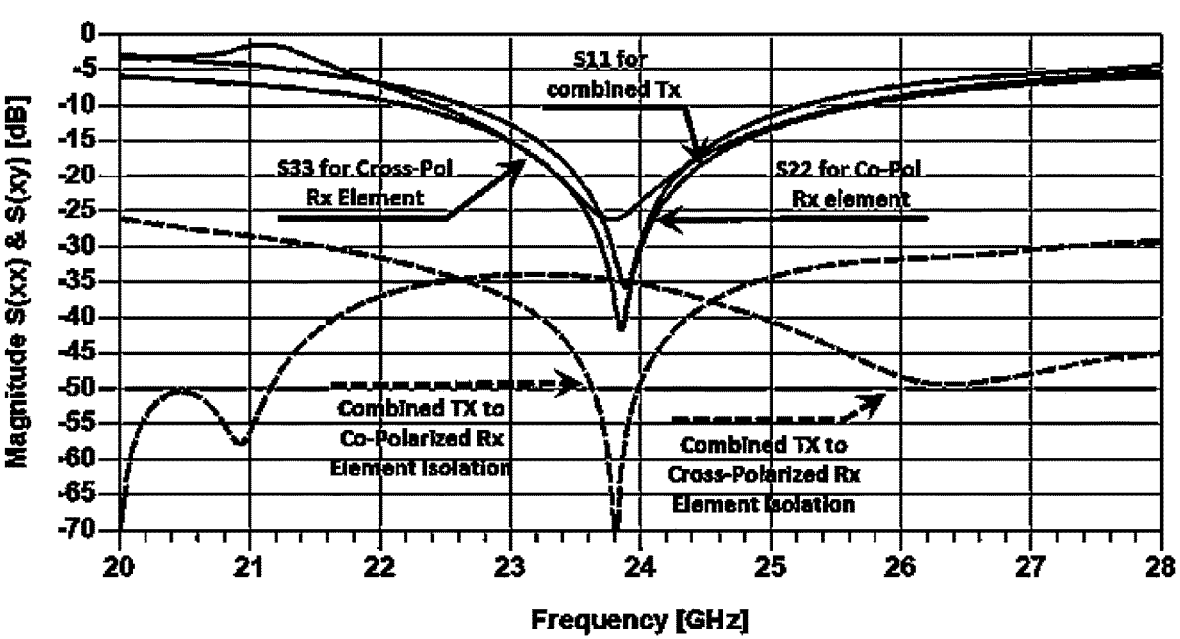
Figure 6C:
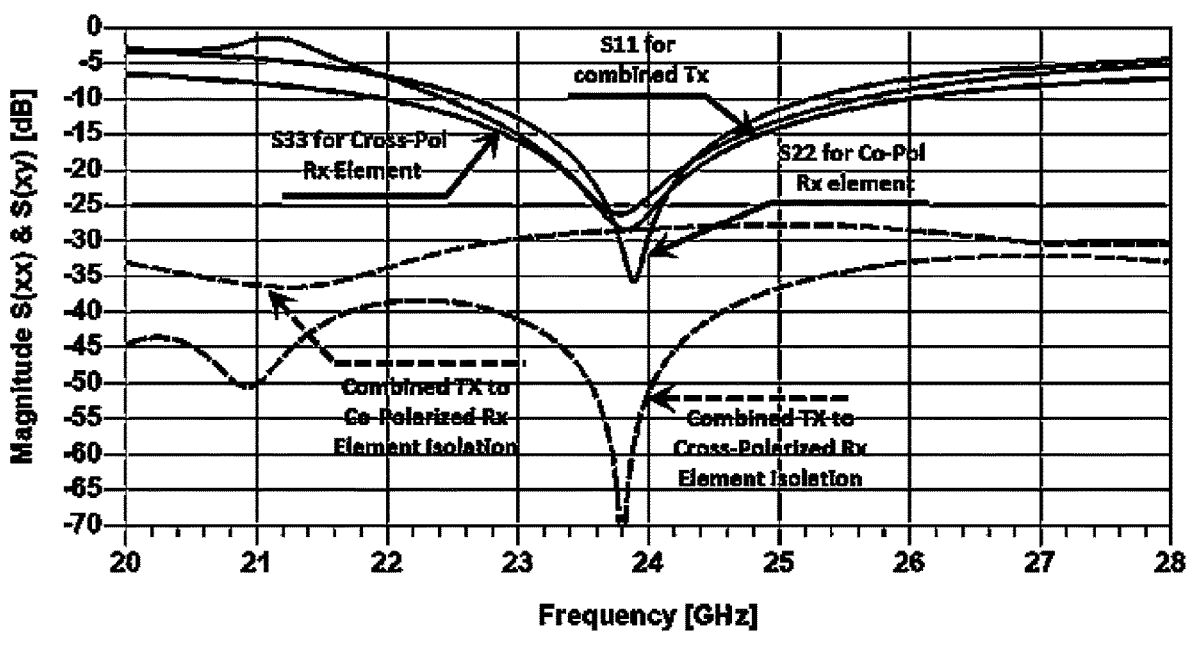

FIGS. 6A, 6B, 6C, 7A and 7B illustrate examples of isolation performance achieved with antenna arrays comprising a single antenna element which is used as a radar sensor according to embodiments. Specifically, FIGS. 6A, 6B, 6C, 6A and 6B illustrate simulated S-parameters (scattering parameters) for the two feed points (or ports) of the radar sensor antenna element with FIGS. 6A, 6B and 6C corresponding to the 1×8 antenna array of FIG. 2A and FIGS. 7A and 7B corresponding to the 1×8 antenna array of FIG. 2B. It should be noted that due to the symmetric placement of the feed points of radar sensor antenna element relative to feed point of the plurality of antenna element used for beamforming transmissions in the configuration of FIG. 2B, the results shown in FIGS. 7A and 7B correspond equally to both feed points of the radar sensor antenna element.

FIG. 6A shows S-parameter results for the antenna array of FIG. 2A when a center antenna element (which is aligned with other antenna elements in the antenna array) is used for radar reception and all (patch) antenna elements are configured to be in phase for boresight operation (for maximal gain to a direction perpendicular to the plane of the antenna array), whereby the isolation towards the two orthogonal polarizations on the sensor antenna element is not optimized. The obtained isolation values using this beamforming configuration are in the order of 30 to 35 dB. Said result may be considered insufficient for satisfying isolation limits needed for Full Duplex operation at the terminal device (typically smaller than −50 dB). The maximum antenna gain at 24 GHz is 13.9 dB in this case. Said maximum antenna gain corresponds to a direction perpendicular to the plane of the antenna array.

As described above, an antenna array with an orientationally aligned radar sensor antenna element may require two sequential measurements using two different beamforming configurations to obtain the needed isolation towards the two polarizations of the aligned radar sensor antenna element.

FIG. 6B shows S-parameter results for the antenna array of FIG. 2A when a center antenna element (which is aligned with other antenna elements in the antenna array) is used for radar reception and all (patch) antenna elements are configured for boresight operation with optimal isolation for the co-polarization (i.e., for the first feed point 216 of FIG. 2A). The optimal isolation for the co-polarization is achieved with the beamforming configuration values shown in the table below. Said beamforming configuration may correspond to the first beamforming configuration of block 401 of FIG. 4.

| 1 × 4 TX Sub-Array 1st Part | | | |
| --- | --- | --- | --- |
| Patch#1 | Patch#2 | Patch#3 | Patch#4 |
| Traditional 0° | 0° | 0° | 0° |
| Tuned 0° | -6° | 38° | 0° |

| 1 × 4 TX Sub-Array 2nd Part | | | |
| --- | --- | --- | --- |
| Patch#5 | Patch#6 | Patch#7 | Patch#8 |
| Traditional — | 0° | 0° | 0° |
| Tuned — | 0° | 38° | -6° |

The isolation from the combined Tx signal towards the co-polarized radar sensor antenna element is now much better (being smaller than −50 dB) and sufficient for satisfying isolation limit for full duplex operation. The maximum antenna gain at 24 GHz is 13.5 dB in this case. Said maximum antenna gain corresponds, again, to a direction perpendicular to the plane of the antenna array.

FIG. 6C shows S-parameter results for the antenna array of FIG. 2A when a center antenna element (which is aligned with other antenna elements in the antenna array) is used for radar reception and all (patch) antenna elements are configured for boresight operation with optimal isolation for the cross-polarization (i.e., for the second feed point 221 of FIG. 2A). The optimal isolation for the cross-polarization is achieved with the beamforming configuration values shown in the table below. Said beamforming configuration may correspond to the second beamforming configuration of block 403 of FIG. 4.

| 1 × 4 TX Sub-Array 1st Part | | | |
| --- | --- | --- | --- |
| Patch#1 | Patch#2 | Patch#3 | Patch#4 |
| Traditional 0° | 0° | 0° | 0° |
| Tuned 0° | 0° | -12° | -22° |

| 1 × 4 TX Sub-Array 2nd Part | | | |
| --- | --- | --- | --- |
| Patch#5 | Patch#6 | Patch#7 | Patch#8 |
| Traditional — | 0° | 0° | 0° |
| Tuned — | 50° | 25° | 0° |

The isolation from the combined Tx signal towards the cross-polarized radar sensor antenna element is now much improved (being smaller than −50 dB) and sufficient for satisfying isolation limit for full duplex operation. The maximum antenna gain at 24 GHz is 13.2 dB in this case. Said maximum antenna gain corresponds, again, to a direction perpendicular to the plane of the antenna array.

Figure 7A:
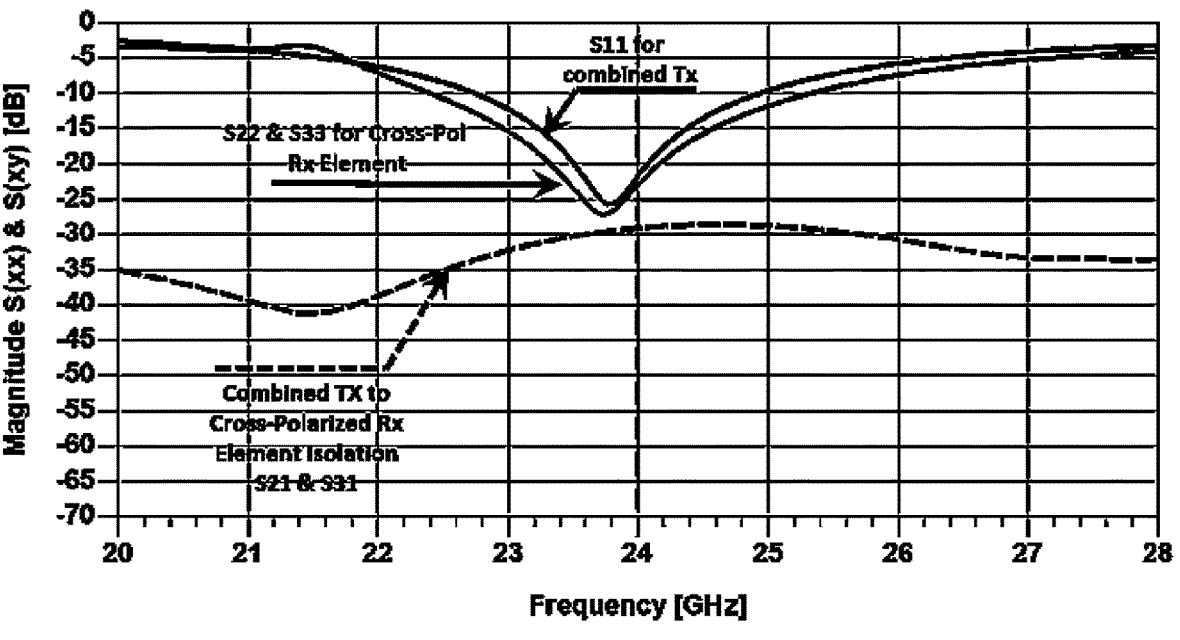

FIG. 7A shows S-parameter results for the antenna array of FIG. 2B when a center antenna element (which is rotated relative to other antenna elements in the antenna array by 45°) is used for radar reception and all (patch) antenna elements are configured to be in phase for boresight operation (for maximal gain to a direction perpendicular to the plane of the antenna array). Here, the isolation towards the two orthogonal polarizations on the sensor antenna element is not optimized. The obtained isolation values are in the order of 30 dB, which may be considered insufficient for satisfying isolation limits needed for Full Duplex operation at the terminal device (typically smaller than −50 dB). The maximum antenna gain at 24 GHz is 13.9 dB in this case. Said maximum antenna gain corresponds to a direction perpendicular to the plane of the antenna array.

Figure 7B:
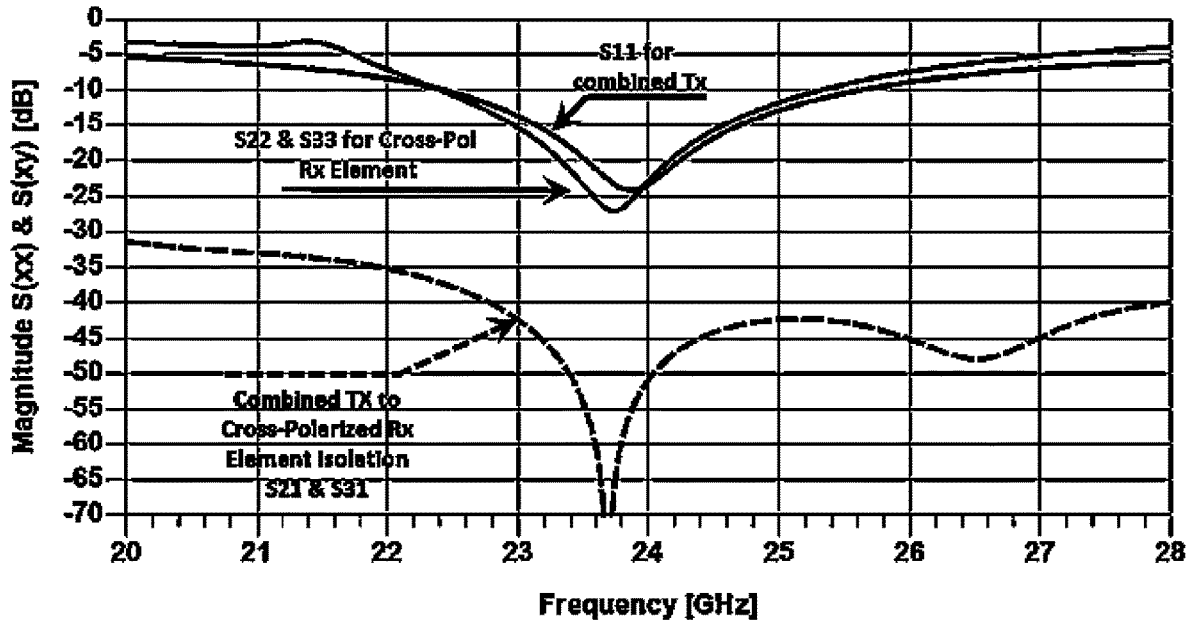

The configuration example with a rotated radar sensor antenna element supports simultaneously measurements of the two orthogonal polarizations received by the rotated radar sensor antenna element as the needed isolation towards the two polarizations of the rotated radar sensor antenna element may be obtained with the same beamforming configuration. FIG. 7B shows S-parameter results for the antenna array of FIG. 2B when a center antenna element (which is rotated relative to other antenna elements in the antenna array) is used for radar reception and all (patch) antenna elements are configured for boresight operation with optimal isolation for both co- and cross-polarizations (i.e., for the first and second feed point 223, 224 of FIG. 2B). The optimal isolation for the cross-polarization is achieved with the beamforming configuration values shown in the table below. Said beamforming configuration may correspond to the first beamforming configuration of block 501 of FIG. 5.

| 1 × 4 TX Sub-Array 1st Part | | | |
| --- | --- | --- | --- |
| Patch#1 | Patch#2 | Patch#3 | Patch#4 |
| Traditional 0° | 0° | 0° | 0° |
| Tuned 0° | 0° | -12° | -22° |

| 1 × 4 TX Sub-Array 2nd Part | | | |
| --- | --- | --- | --- |
| Patch#5 | Patch#6 | Patch#7 | Patch#8 |
| Traditional — | 0° | 0° | 0° |
| Tuned — | 50° | 25° | 0° |

The isolations from the combined Tx signal towards both polarizations of the rotated radar sensor antenna element is now better and sufficient for satisfying isolation limits needed for full duplex operation at the terminal device (typically smaller than −50 dB). The maximum antenna gain at 24 GHz is 13.1 dB in this case. Said maximum antenna gain corresponds, again, to a direction perpendicular to the plane of the antenna array.

Figure 8:
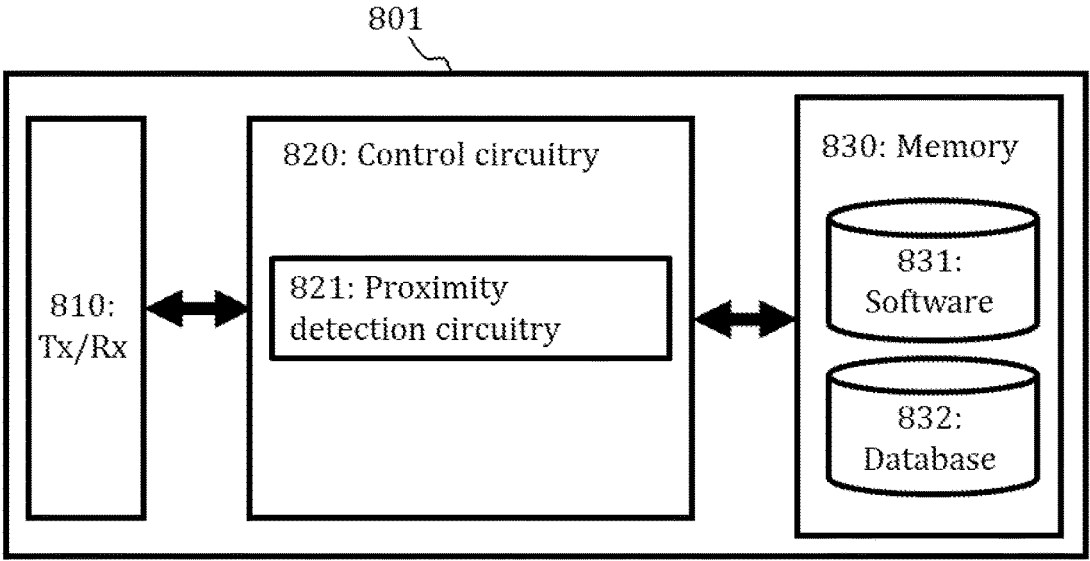
FIG. 8 illustrates an apparatus according to embodiments.

FIG. 8 provides an apparatus 801 (or a computing device) at least for performing beamforming (or causing performing of beamforming by a radio front end of a radio transceiver or transmitter). Specifically, the apparatus 801 may be a baseband processing unit or a beam steering control unit of beamforming transceiver (or transmitter). Alternatively, the apparatus may be computing device electrically connected to a beamforming transceiver (or transmitter). The apparatus 801 may be a 5G apparatus. The apparatus 801 may be an apparatus comprising or electrically connected to control units 354 to 356 of FIG. 3. The apparatus 801 may be comprised in (i.e., form a part of) a terminal device.

The apparatus 801 may comprise one or more control circuitry 820, such as at least one processor, and at least one memory 830, including one or more algorithms 831, such as a computer program code (software) wherein the at least one memory and the computer program code (software) are configured, with the at least one processor, to cause the apparatus to carry out any one of the exemplified functionalities of the apparatus described above. Said at least one memory 830 may also comprise at least one database 832.

Referring to FIG. 8, the one or more communication control circuitry 820 comprise at least proximity detection circuitry 821 which is configured to perform proximity detection and transmit power adjustment according to embodiments (in communication with RF elements of the RF front end of the beamforming transceiver). To this end, the proximity detection circuitry 821 is configured to carry out at least some of the functionalities described above by means of any of FIGS. 5 and 6 using one or more individual circuitries.

Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the apparatus 801 may further comprise different interfaces 810 such as one or more signaling interfaces (TX/RX) comprising hardware and/or software for realizing communication connectivity according to one or more communication protocols. Specifically, the one or more signaling interfaces 810 may comprise, for example, interfaces providing a (wired) connection (via one or more control units) to a plurality of electrically tunable phase shifters, one or more power amplifiers and one or more other units or elements of the beamforming transceiver (e.g., to one or more low-noise amplifiers of the RF front end). Specifically, the interfaces 810 may comprise interfaces providing a connection to inputs/outputs 357 to 360 of the RF front end 300 of FIG. 3. The one or more signaling interfaces 810 may, in some embodiments, provide the apparatus with communication capabilities to communicate in a cellular or wireless communication system, to access the Internet and a core network of a wireless communications network and/or to enable communication between user devices (terminal devices) and different network nodes or elements, for example.

The one or more signaling interfaces 810 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 4 and 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 4 and 5 or operations thereof.

According to an embodiment, there is provided an apparatus for a radio frequency front end of a beamforming transmitter or transceiver, the apparatus comprising means for:

first means for reception of electromagnetic waves transmitted via an antenna array of the radio frequency front end and subsequently reflected from at least one obstruction to said first means, wherein said first means comprise a first feed point for reception of a first polarization and a second feed point for reception of a second polarization;

second means for switching between reception of the first polarization and reception of the second polarization; and third means for outputting signals received at least via the second means from the radio frequency front end.

According to an embodiment, there is provided an apparatus for a radio frequency front end of a beamforming transmitter or transceiver, the apparatus comprising means for:

first means for reception of electromagnetic waves transmitted via an antenna array of the radio frequency front end and subsequently reflected from at least one obstruction to said first means, wherein said first means comprise a first feed point for reception of a first polarization and a second feed point for reception of a second polarization;

second means for combining signals received via the first means; and third means for outputting signals received at least via the second means from the radio frequency front end.

According to an embodiment, there is provided a radio frequency front end for a beamforming transceiver, the radio frequency front end comprising:

first means for beamforming transmission using at least a third polarization and beamforming reception using the third polarization and a fourth polarization;

second means for reception of electromagnetic waves transmitted by the first means and subsequently reflected from at least one obstruction to said second means, wherein said second means comprise a first feed point for reception of a first polarization and a second feed point for reception of a second polarization, the third polarization corresponding to a substantially equal linear combination of the first and second polarizations;

a first plurality of radio frequency transceiver means electrically connected to first feed points of the first means for the beamforming reception and transmission using the third polarization and via a first feed point of the second means to said second means for the reception of the electromagnetic waves transmitted by the first means and subsequently reflected from said at least one obstruction using the first polarization;

a second plurality of radio frequency transceiver or receiver means electrically connected to second feed points of the first means for at least the beamforming reception using the fourth polarization and via a second feed point of said second means to said second means for the reception of the electromagnetic waves transmitted by the second means and subsequently reflected from said at least one obstruction using the second polarization;

first divider/combiner means for dividing signals to be transmitted to and combining signals received from the first plurality of radio frequency transceiver means; and second divider/combiner means for dividing signals to be transmitted to and combining signals received from the second plurality of radio frequency transceiver or receiver means.

According to an embodiment, there is provided an apparatus (e.g., a computing device) comprising means for:

causing transmitting, using a beamforming device being one of a radio transmitter and transceiver, electromagnetic waves using a first beam formed by applying a first beamforming configuration to a plurality of electrically tunable phase shifters of a plurality of radio frequency transmitter chains of the beamforming device, wherein the plurality of electrically tunable phase shifters are electrically connected to a plurality of antenna elements of an antenna array of the beamforming device and the first beamforming configuration is optimized for transmission to a first beamforming direction while achieving isolation of a pre-defined level between the plurality of antenna elements and a first feed point of a dual-polarized antenna element of the beamforming device corresponding to the first polarization;

measuring a first signal corresponding to a first polarization via said first feed point of said dual-polarized antenna element and via a switch for switching between reception of the first polarization via the first feed point of the dual-polarized antenna element and reception of the second polarization via a second feed point of the dual-polarized antenna element, the switch being set to a first position for receiving the first polarization, wherein the first signal corresponds to the electromagnetic waves transmitted using the first beam and subsequently reflected from at least one obstruction towards said dual-polarized antenna element;

causing transmitting, using the beamforming device, electromagnetic waves using a second beam formed by applying a second beamforming configuration to the plurality of electrically tunable phase shifters (and having the same polarization as the first beam), wherein the second beamforming configuration is optimized for transmission to the first beamforming direction while achieving isolation of a pre-defined level between the plurality of antenna elements and the second feed point of the dual-polarized antenna element corresponding to the second polarization;

measuring a second signal corresponding to a second polarization via said second feed point of said dual-polarized antenna element and the switch, the switch being set to second position for receiving the second polarization, wherein the second signal corresponds to the electromagnetic waves transmitted using the second beam and subsequently reflected from at least one obstruction towards said dual-polarized antenna element;

performing proximity detection based on the measured first and second signals; and causing adjusting transmit power of the beamforming device based on results of the proximity detection.

Embodiments as described above may also be carried out in the form of a computer process defined by a computer program or portions thereof. Embodiments of the methods described in connection with FIGS. 4 and 5 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided a computer program comprising instructions for causing an apparatus to perform the embodiments of the methods described in connection with FIGS. 4 and 5.

According to an embodiment, there is provided a computer readable medium comprising program instructions for causing an apparatus to perform the embodiments of the methods described in connection with FIGS. 4 and 5.

According to an embodiment, there is provided a non-transitory computer readable medium comprising program instructions for causing an apparatus to perform the embodiments of the methods described in connection with FIGS. 4 and 5.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a radio frequency front end of a beamforming transmitter or transceiver, the apparatus comprising:

a dual-polarized antenna element for reception of electromagnetic waves transmitted via an antenna array, comprising the dual-polarized antenna element, of the radio frequency front end and subsequently reflected from at least one obstruction to said dual-polarized antenna element, wherein said dual-polarized antenna element comprises a first feed point for reception of a first polarization and a second feed point for reception of a second polarization;

a switch for switching between reception of the first polarization via the first feed point of the dual-polarized antenna element and reception of the second polarization via the second feed point of the dual-polarized antenna element, wherein the first polarization and the second polarization comprise different types selected from linear, elliptical or circular polarizations; and an output for outputting signals received at least via the switch from the radio frequency front end.

2. The apparatus of claim 1, wherein the first and second polarizations are orthogonal polarizations and the radio frequency front end is configured to transmit via the antenna array electromagnetic waves of at least one of said first and second polarizations.

3. The apparatus according to claim 1, further comprising: a low-noise amplifier for amplifying signals received via the switch before the outputting.

4. The apparatus according to claim 1, further comprising: the antenna array comprising at least a plurality of antenna elements for beamforming transmission.

5. The apparatus according to claim 4, wherein said dual-polarized antenna element and the plurality of antenna elements for the beamforming transmission have equal geometry, equal dimensions and equal orientation and a feed point of the plurality of antenna elements corresponds to one of the first and second feed points.

6. An apparatus for a radio frequency front end of a beamforming transmitter or transceiver, the apparatus comprising:

a dual-polarized antenna element for reception of electromagnetic waves transmitted via an antenna array, comprising the dual-polarized antenna element, of the radio frequency front end and subsequently reflected from at least one obstruction to said dual-polarized antenna element, wherein said dual-polarized antenna element comprises a first feed point for reception of a first polarization and a second feed point for reception of a second polarization, wherein the first polarization and the second polarization comprise different types selected from linear, elliptical or circular polarizations;

a combiner for combining signals received via the first and second feed points of the dual-polarized antenna element; and an output for outputting signals received at least via the combiner from the radio frequency front end.

7. The apparatus of claim 6, wherein the first and second polarizations are orthogonal polarizations and the radio frequency front end is configured to transmit via the antenna array electromagnetic waves of a third polarization corresponding to a substantially equal linear combination of the first and second polarizations.

8. The apparatus according to claim 6, further comprising: a low-noise amplifier for amplifying combined signals before the outputting.

9. The apparatus according to claim 6, further comprising: the antenna array comprising at least a plurality of antenna elements for beamforming transmission.

10. The apparatus according to claim 9, wherein said dual-polarized antenna element and the plurality of antenna elements have equal geometry and equal dimensions and the plurality of antenna elements have equal orientation, an orientation of said dual-polarized antenna element corresponding to an orientation of the plurality of antenna elements rotated by 40°-50° around a rotation axis pointing to a broadside direction of the antenna array.

11. The apparatus according to claim 9, wherein the antenna array is a linear array and said dual-polarized antenna element is arranged between first and second subarrays formed by the plurality of antenna elements.

12. A method comprising:

causing transmitting, using a beamforming device being one of a radio transmitter and transceiver, electromagnetic waves using a first beam formed by applying a first beamforming configuration to a plurality of electrically tunable phase shifters of a plurality of radio frequency transmitter chains of the beamforming device, wherein the plurality of electrically tunable phase shifters are configured to apply phase shifts to a plurality of antenna elements of an antenna array of the beamforming device and the first beamforming configuration is optimized for transmission to a first beamforming direction while achieving isolation of a predefined level between the plurality of antenna elements and a first feed point of a dual-polarized antenna element of the beamforming device corresponding to the first polarization;

measuring a first signal corresponding to a first polarization via said first feed point of said dual-polarized antenna element and via a switch for switching between reception of the first polarization via the first feed point of the dual-polarized antenna element and reception of the second polarization via a second feed point of the dual-polarized antenna element, the switch being set to a first position for receiving the first polarization, wherein the first signal corresponds to the electromagnetic waves transmitted using the first beam and subsequently reflected from at least one obstruction towards said dual-polarized antenna element;

causing transmitting, using the beamforming device, electromagnetic waves using a second beam formed by applying a second beamforming configuration to the plurality of electrically tunable phase shifters, wherein the second beam has the same polarization as the first beam and the second beamforming configuration is optimized for transmission to the first beamforming direction while achieving isolation of a pre-defined level between the plurality of antenna elements and the second feed point of the dual-polarized antenna element corresponding to the second polarization;

measuring a second signal corresponding to a second polarization via said second feed point of said dual-polarized antenna element and the switch, the switch being set to a second position for receiving the second polarization, wherein the second signal corresponds to the electromagnetic waves transmitted using the second beam and subsequently reflected from at least one obstruction towards said dual-polarized antenna element;

performing proximity detection based on the measured first and second signals; and causing adjusting transmit power of the beamforming device based on results of the proximity detection.

13. A non-transitory computer readable medium comprising program instructions that, when executed by an apparatus, cause the apparatus to perform at least the following:

causing transmitting, using a beamforming device being one of a radio transmitter and transceiver, electromagnetic waves using a first beam formed by applying a first beamforming configuration to a plurality of electrically tunable phase shifters of a plurality of radio frequency transmitter chains of the beamforming device, wherein the plurality of electrically tunable phase shifters are configured to apply phase shifts to a plurality of antenna elements of an antenna array of the beamforming device and the first beamforming configuration is optimized for transmission to a first beamforming direction while achieving isolation of a predefined level between the plurality of antenna elements and a first feed point of a dual-polarized antenna element of the beamforming device corresponding to the first polarization;

measuring a first signal corresponding to a first polarization via said first feed point of said dual-polarized antenna element and via a switch for switching between reception of the first polarization via the first feed point of the dual-polarized antenna element and reception of the second polarization via a second feed point of the dual-polarized antenna element, the switch being set to a first position for receiving the first polarization, wherein the first signal corresponds to the electromagnetic waves transmitted using the first beam and subsequently reflected from at least one obstruction towards said dual-polarized antenna element;

causing transmitting, using the beamforming device, electromagnetic waves using a second beam formed by applying a second beamforming configuration to the plurality of electrically tunable phase shifters, wherein the second beam has the same polarization as the first beam and the second beamforming configuration is optimized for transmission to the first beamforming direction while achieving isolation of a pre-defined level between the plurality of antenna elements and the second feed point of the dual-polarized antenna element corresponding to the second polarization;

measuring a second signal corresponding to a second polarization via said second feed point of said dual-polarized antenna element and the switch, the switch being set to a second position for receiving the second polarization, wherein the second signal corresponds to the electromagnetic waves transmitted using the second beam and subsequently reflected from at least one obstruction towards said dual-polarized antenna element;

performing proximity detection based on the measured first and second signals; and causing adjusting transmit power of the beamforming device based on results of the proximity detection.

14. The method of claim 12, wherein the first and second polarizations are orthogonal polarizations and a radio frequency front end is configured to transmit via the antenna array electromagnetic waves of at least one of said first and second polarizations.

15. The method according to claim 12, further comprising:

a low-noise amplifier for amplifying signals received via the switch before the outputting.

16. The method according to claim 12, further comprising:

the antenna array comprising at least a plurality of antenna elements for beamforming transmission.

17. The method according to claim 16, wherein said dual-polarized antenna element and the plurality of antenna elements for the beamforming transmission have equal geometry, equal dimensions and equal orientation and a feed point of the plurality of antenna elements corresponds to one of the first and second feed points.

18. The apparatus of claim 1, wherein the antenna array comprises a plurality of dual-polarized antenna elements including the dual-polarized antenna element.

* * * * *